3,486,987
MULTI-STAGE DISTILLATION WITH DIRECT CONTACT WATER-IMMISCIBLE LIQUID AND SERIALLY CONNECTED EJECTORS
Charles Kassel, Thorigny, Philippe Sachnine, Fontenay-aux-Roses, and Roland Vuillemey, Grenoble, France, assignors to Commissariat a l'Energie Atomique, Paris, France
Filed June 12, 1967, Ser. No. 645,131
Claims priority, application France, June 20, 1966, 66,183
Int. Cl. C02b 1/06; B01d 3/06
U.S. Cl. 203—11          2 Claims

ABSTRACT OF THE DISCLOSURE

A process for the desalination of sea water which comprises heating the sea water under pressure, expansion of the heated sea water in successive stages and at progressively decreasing pressures in order to cause the vaporization of said sea water, condensation of the vapor produced at each stage by mixing said vapor with a colder liquid which is circulated countercurrent to the sea water and at progressively increasing pressures within ejectors which aspirate said vapor and play a contributory role in maintaining the pressure difference between two successive stages.

---

This invention relates to a process for the desalination of sea water by evaporation and condensation as well as a plant for the execution of said process or a like process.

The invention is primarily concerned with processes for the desalination of sea water which comprise heating the sea water under pressure followed by expansion in successive stages at progressively decreasing pressures so as to vaporize it and to condense the fresh-water vapor obtained at each stage by mixing with a colder liquid which is circulated countercurrent to the sea water.

The essential object of the invention is to simplify as far as possible the equipment which is necessary for the purpose of producing variations in pressure from one stage to the next and also to reduce the corresponding power consumption.

As is already well known, the wall-less evaporation process essentially makes it possible to circumvent the problems of corrosion and scale formation which arise from the use of conventional heat exchangers, and thus presents the following advantages:

There is no reduction in efficiency of heat transfer as a result of the formation of deposits, The equipment is simplified, Corrosion problems are of less gravity, High heat transfer coefficients result in improved energy efficiency.

However, in the known processes which make use of a heat-transporting medium for causing both evaporation of the sea water and condensation of the fresh-water vapor which is produced, said vapor is usually contacted with the heat-transporting medium during condensation by spraying said heat-transporting medium into spray towers through which said vapor is circulated. This method calls for very large plant volumes in order to ensure sufficiently long contacting or heat-transfer times. These volumes are even larger in the case of multi-stage processes which alone offer economic feasibility and in which some stages operate at low pressure. The pumping power is high and becomes prohibitive when the number of stages is substantial by reason of the fact that, apart from the pressure difference between the end stages and the pressure drops, the pumping power must raise the entire quantity of liquid to a level which corresponds to the total height of all the spray towers, Moreover, in the known plants, the devices which produce different pressures at each stage are independent; they therefore entail the use of additional equipment and power which are added to the costs of installation and operation.

While retaining the advantages of the wall-less evaporation processes, the present invention makes it possible to remove the disadvantages which have been outlined in the foregoing.

Accordingly, the invention is concerned with a process for the desalination of sea water which comprises heating the sea water under pressure, expansion of the heated sea water in successive stages and at progressively decreasing pressures in order to cause the vaporization of said sea water, condensation of the vapor produced at each stage by mixing said vapor with a liquid which is circulated countercurrent to the sea water and at progressively increasing pressures within ejectors which aspirate said vapor and play a contributory role in maintaining the pressure difference between two successive stages.

The invention is also directed to a sea-water desalination plant for the execution of the above process or of any like process. The plant under consideration comprises means for heating sea water under pressure and in the liquid state, means for circulating the heated sea water through a plurality of serially disposed evaporators and at progressively decreasing pressures, means for circulating a liquid which is colder than the sea water and countercurrent thereto within serially disposed ejectors which are each associated with each evaporator and in each of which said liquid aspirates the vapor produced within the associated evaporator and condenses said vapor by mixing.

There will now be described by way of example one particular mode of execution of the process according to the invention as well as one example of construction of a plant for the application of said process. This description is not intended to imply any limitation of the invention. Reference is made to FIGS. 1 to 6 of the accompanying drawings, in which.

Figure 1:
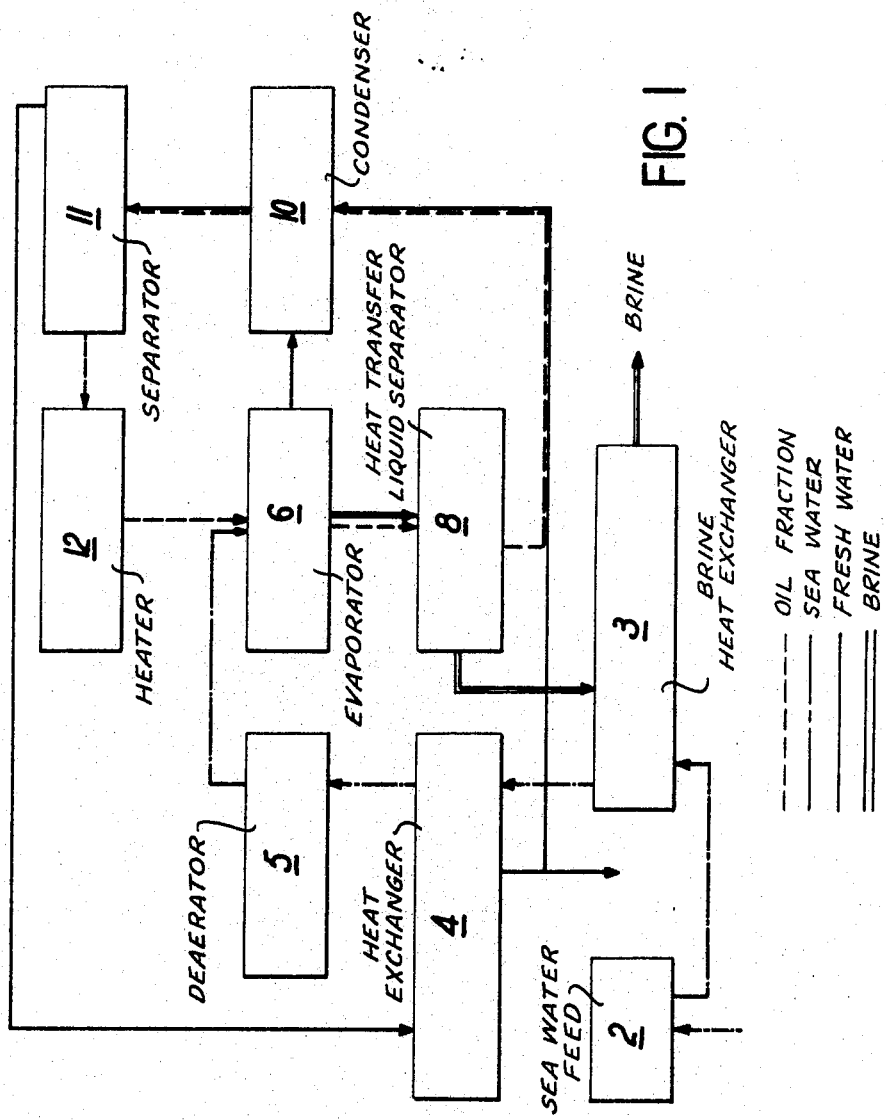
FIG. 1 is a schematic diagram of the complete process as herein described.

The different stages of the process according to the invention are illustrated diagrammatically in FIG. 1. The sea water which is collected by a pumping station 2 is preheated successively within the recovery heat-exchangers 3 and 4 by the brine and the fresh water which leave the plant respectively. The sea water under pressure which is thus heated is then deaerated at 5, then fed in a mixture with the hot heat-transporting medium into the evaporation section 6.

At the outlet of the evaporation section, the heat-transporting medium is separated from the brine at 8. The brine is removed through the recovery heat-exchanger 3 whilst the heat-transporting medium is cooled by addition of fresh water which is taken from the product end of the plant. The mixture of heat-transporting medium and fresh water then serves at 10 to condense the vapor produced in the evaporation section 6. The heat-transporting medium is separated from the fresh water which is produced at 11, then fed into the heating unit 12 prior to a new cycle. The heat available in the fresh water which is produced is recovered in the heat exchanger 4.

Figure 2:
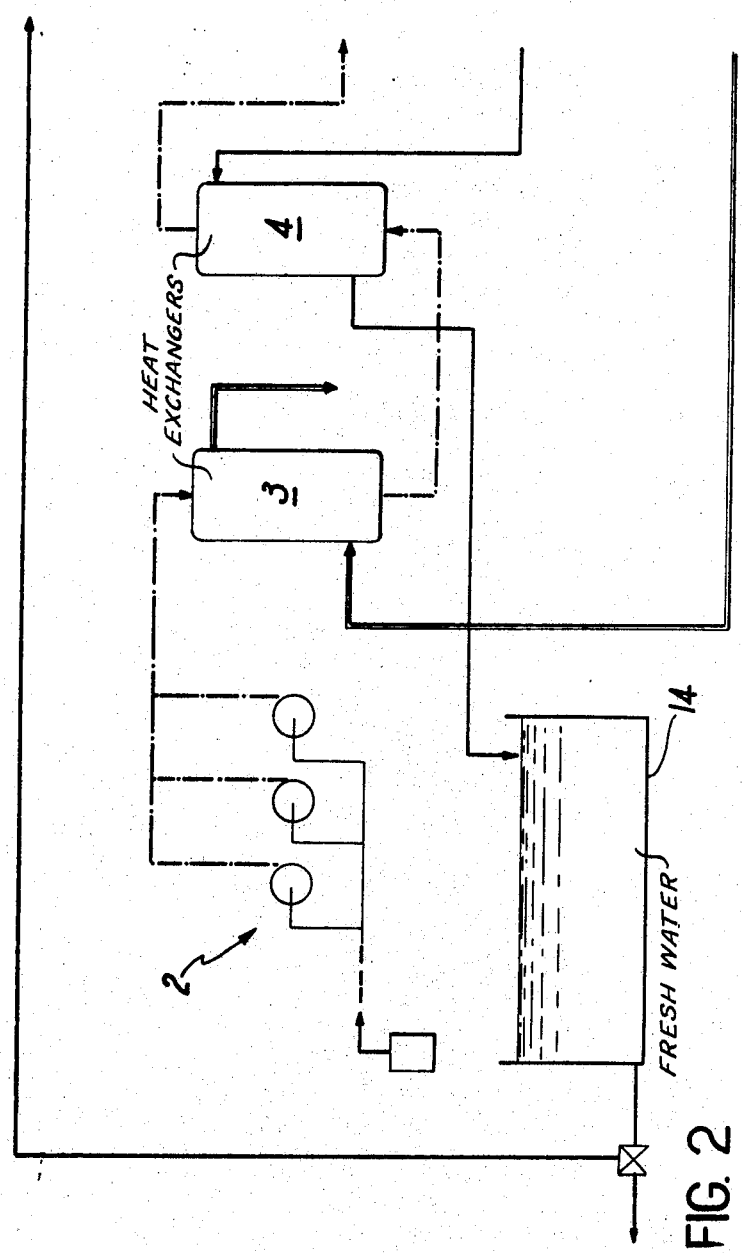
FIGS. 2 to 5 show the functions of the plant employed for the execution of the process, in the form of a schematic diagram which has been subdivided into a number of sheets.

There are shown in FIG. 2 on the one hand the pumping station 2 which delivers the sea water to the evaporation section through recovery heat-exchangers 3 and 4 and on the other hand a reservoir 14 which receives the fresh water produced by the plant, said fresh water being cooled in the heat exchanger 4 by heat transfer with the sea water. The heat exchanger 3 carries out a first preheating of the sea water by recovery of the heat available in the brine which is derived from the evaporation section. A fraction of the fresh water of the reservoir 14 is drawn off to feed the fresh water condensation equipment.

The heat exchangers 3 and 4 are conventional tubular heat exchangers. However, problems of wall corrosion and scale formation need not be expected since the temperatures of the fluids which are circulated therein remain relatively low.

Figure 3:
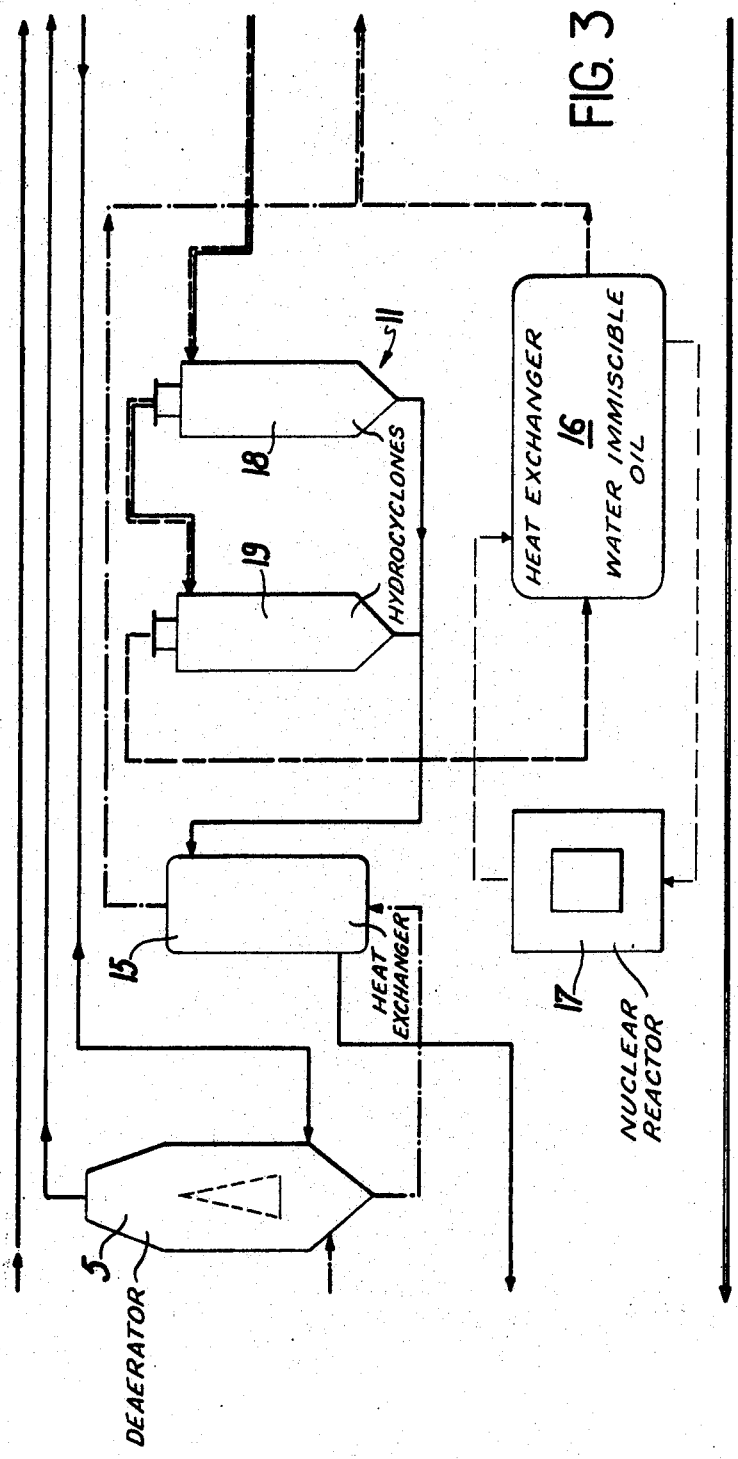

As is apparent from FIG. 3, the preheated sea water is fed into the deaerator 5. Deaeration is performed by passing steam derived from the evaporation section through the unit 5 and has the intended function of limiting the corrosive action of sea water in the heat exchangers. The sea water which passes out of the deaerator 5 is again preheated with the fresh water produced by the plant in the conventional tubular heat exchanger 15. Said sea water is then injected into the heat-transport duct which supplies the evaporation section.

The heat-transporting medium which is employed in the particular case herein described is an oil which is derived from petroleum fractionation and which is stable with respect to water up to 180 to 200° C. This heat-transporting medium is circulated in a closed circuit between the evaporation and condensation sections. Prior to mixing with the preheated sea water, the oil is heated in a heat exchanger 16 of the horizontal tube type by steam which is produced in a nuclear reactor 17.

There is also shown in FIG. 3 the section 11 for separating fresh water from the heat-transporting medium at the outlet of the condensation section. The equipment employed comprises two hydrocyclones 18 and 19 mounted in series. The separated heat-transporting medium is recycled to the heat exchanger 16 whilst the fresh water is fed into the reservoir 14 through the recovery heat-exchangers 15 and 4.

Figure 4:
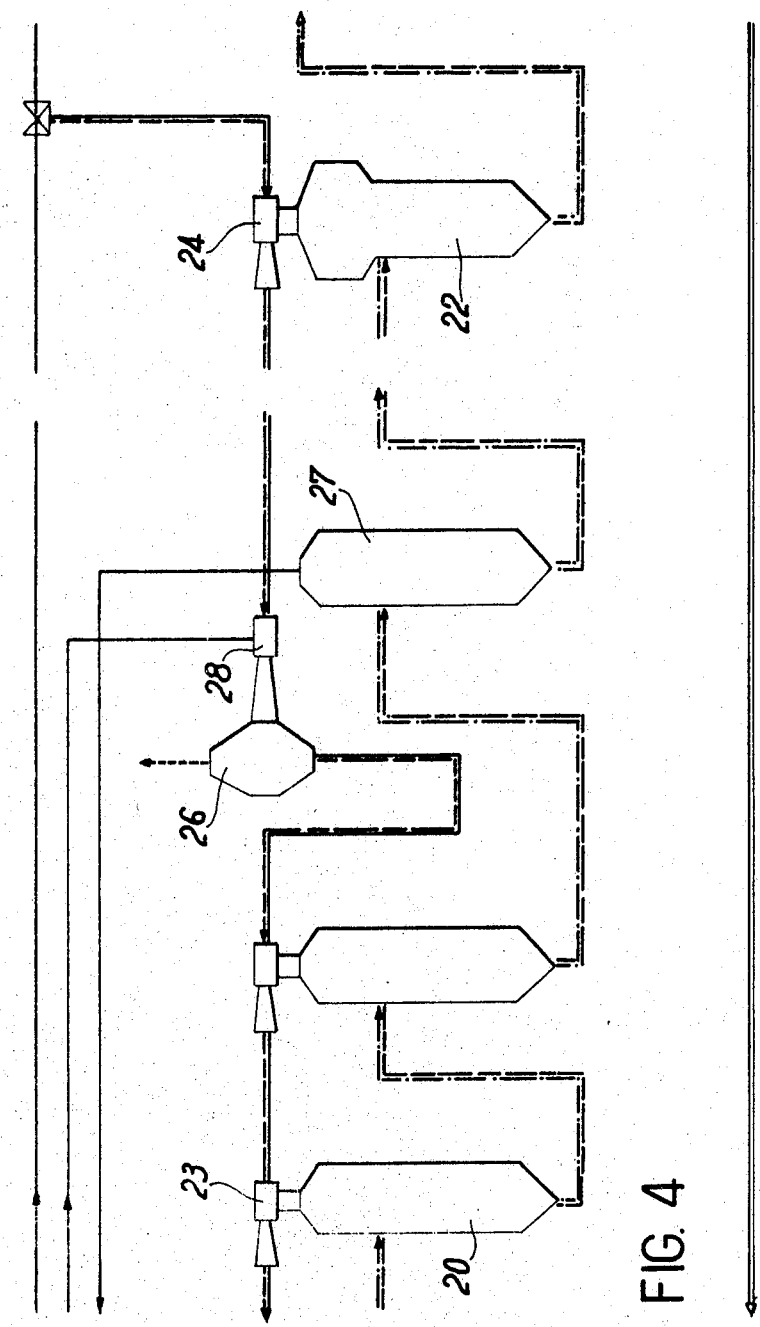

The evaporation and condensation sections are shown in FIG. 4.

The evaporation process is carried out in fifty serially arranged expansion stages. The sea water under pressure is mixed with the heat-transporting medium by which it is heated, fed into the first evaporator 20 at 150° C. and delivered from the last evaporator 22 at 50° C. The mixture is injected tangentially into each evaporator, the bottom of which is designed in the form of a cyclone in order to assist turbulent flow. The pressure within the different evaporators is adjusted so that the corresponding temperatures vary uniformly in steps of 2° C.

An ejector such as the ejector 23 is associated with each evaporator. The complete assembly of ejectors ensures simultaneously on the one hand the condensation of the vapor produced at each stage and, on the other hand, the regulation of operating pressures of the different evaporators. The ejector 24 which is associated with the final evaporator 22 (or low-pressure unit) admits the heat-transporting medium which is separated from the brine and which has previously been cooled by injection of a small quantity of fresh water taken from the reservoir 14. The cooling process referred-to is made necessary by the differences in variations of energy arising between condensation and evaporation. Cooling could also be carried out without any addition of fresh water, for example by cooling the heat-transporting medium in a heat exchanger.

The mixture of heat-transporting medium and fresh water passes through the different ejectors in series and in counterflow to the sea water while entraining at each stage the vapor which is produced in the corresponding evaporator. The condensation of said vapor is effected simultaneously by the heat-transporting medium, the temperature of which is always lower than that of the vapor of the corresponding stage, and by the pressure rise from one ejector to the next.

Inasmuch as the pressure rise per stage is of a very low order, it is possible to make use of ejectors having very small variations of velocity, with the result that losses in pressure and in necessary pumping power remain at minimum values. Each ejector is provided with conventional equipment for the purpose of controlling pressures as well as a non-return device on the vapor-inlet side.

A cyclone 26 for purging noncondensable vapor is additionally provided at the level of that stage from which vapor is withdrawn for deaerating the water, namely the stage at which the vaporization temperature corresponds substantially to the temperature of the sea water in the deaerator. In the case herein described, the evaporator under consideration has the reference numeral 27 and its operating temperature is 100° C. The vapor which leaves said evaporator passes through the deaerator 5 before reaching the ejector 28 which is associated therewith and finally arriving at the cyclone 26. Said cyclone permits the removal of noncondensable vapor derived from the deaeration of the sea water.

Figure 5:
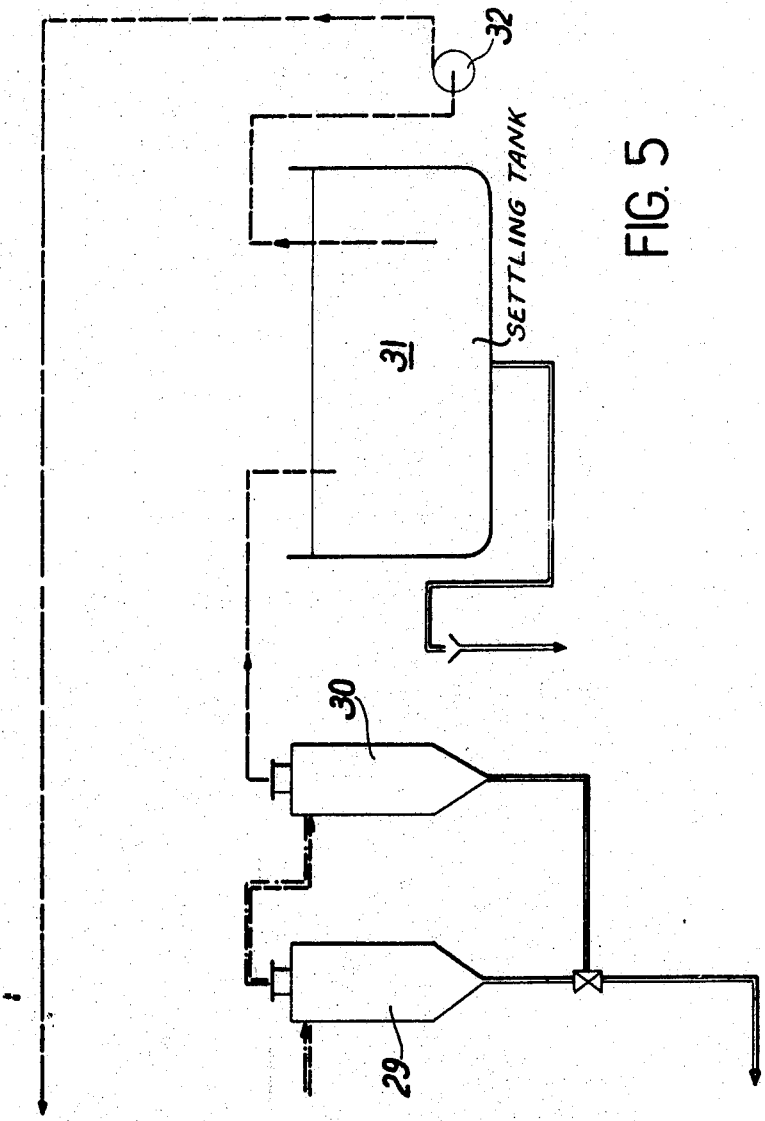

FIG. 5 shows the equipment which is employed by way of example for the purpose of separating the heat-transporting medium from the brine at the outlet of the evaporation section. The mixture is processed in two separators 29 and 30 of the hydrocyclone type which are mounted in series and which serve to separate the brine. The heat-transporting medium which still entrains a small quantity of brine is completely freed of this latter within a static settling tank 31. The heat-transporting medium is then recirculated by a pump 32 in order to be fed into the condensation ejectors.

Figure 6:
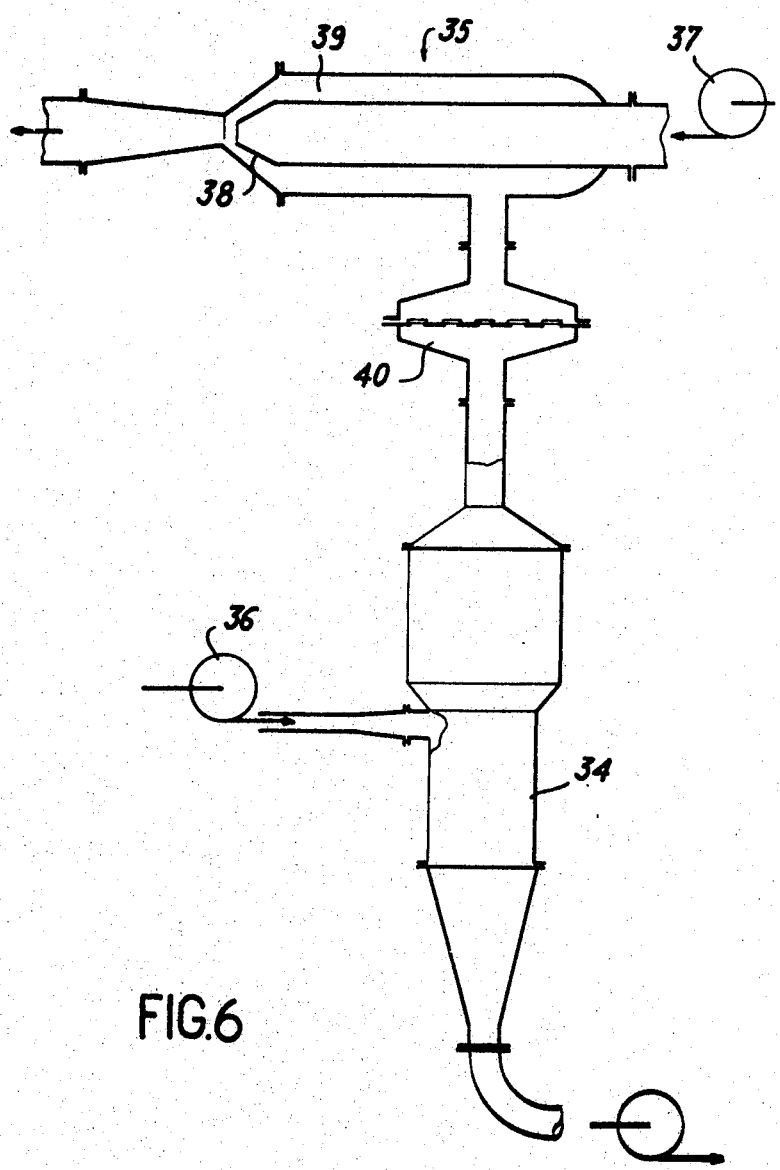
FIG. 6 shows an evaporator and associated ejector.

FIG. 6 shows by way of example an evaporator 34 with an associated ejector 35. A circulator 36 effects the transfer of liquid sea-water from one evaporator to the next. Similarly, the ejector 35 is associated with a circulator 37 which provides compensation for pressure drops along the path of the entraining fluid (heat-transporting liquid and fresh water). The entraining fluid flows into a nozzle 38 which opens into a suction chamber 39. Said suction chamber communicates with the evaporator 34 through a non-return unit 40 which is equipped with non-return valves. During operation, the entraining fluid aspirates the vapor produced by expansion in the evaporator 34 and said vapor is condensed on the one hand as a result of mixing with the colder entraining fluid and on the other hand as a result of the pressure rise.

By virtue of the association of ejectors and evaporators in accordance with the invention, the heat-transporting fluid employed has three functions:

Supply of the heat which is necessary for the evaporation process,

Condensation of vapor,

The function of driving fluid for the purpose of producing variable pressures at each stage of the process.

This arrangement provides the following main advantages:

No ancillary equipment is required for the purpose of producing different evaporation pressures, thereby reducing pumping costs, Condensation is effected by means of simple devices which are of considerably smaller volume than the spraying systems which perform similar operations in conventional plants, The serial arrangement of the condensation stages makes it possible to retain the pumping power of the heat-transporting fluid at each stage and the overall power which is necessary corresponds solely to the pressure drop of the ejectors to which is added the difference in pressure between the first and the last stage.

As will be readily apparent, the invention is not limited in any respect to the mode of execution of the process which has been described in the foregoing or to the particular installation which has been considered. Accordingly, the mixture of oil and fresh water which effects the condensation of vapor in the series of ejectors can be replaced either by fresh water alone or by oil alone (which has been previously cooled, for example, by heat transfer with fresh water in the event that the heat-transporting medium is also employed for the evaporation process) or alternatively by any other fluid which is immiscible with water and subsequently separated.

What we claim is:

1. A process for the desalination of sea water comprising the steps of heating the sea water under pressure, passing the thus heated sea water through a deaerator, then expanding the heated sea water in successive stages the heated sea water passing through a plurality of evaporators and at progressively decreasing pressures to vaporize said sea water, condensing the vapor produced at each stage by mixing said vapor with a colder liquid which is circulated countercurrent to the sea water in a closed circuit and at progressively increasing pressures within serially connected ejectors, each evaporator having an ejector connected thereto for aspirating said vapor and maintaining the pressure difference between two successive stages, purging non-condensable vapor from the evaporator stages by withdrawing vapor from the stage at which the temperature is about 100° C. and which corresponds substantially to the temperature of the sea water in the deaerator and passing the the withdrawn vapor through the deaerator then returning the resultant deaerated vapor admixed with said liquid to the ejector inlet of the next evaporator stage, said liquid being a heat transporting liquid immiscible and stable with water up to 180–200° C., said liquid including a stream of cooled fresh water condensed from said vapor, the sea water being heated by the heat transporting liquid mixed with the sea water prior to expansion, the heat transporting liquid being circulated in a closed circuit and successively heated, mixed with the sea water, separated from the unvaporized brine after expansion, then mixed with the fresh water vapor of each stage and finally separated from the fresh water at the outlet of the condensing section.

2. A plant for the desalination of sea water comprising evaporation and condensation sections, means for heating a water immiscible heat transfer liquid immiscible and stable with respect to water up to 180–200° C., means for mixing said heated liquid and sea water for heating the sea water under pressure and in the liquid state providing a heated transfer liquid sea water mixture having a temperature of about 150° C., means for circulating said heated sea water transfer liquid mixture through a plurality of serially disposed evaporators and at progressively decreasing pressures producing water vapor and brine concentrate, means for separating the heat transfer liquid from the brine at the outlet of the evaporation section, ejector means for evacuating each evaporator, said ejectors being serially connected, means for cooling a portion of the transfer liquid, as separated from the brine by the injection of cold fresh water condensed from said vapor and at a temperature below that of the sea water-transfer liquid mixture evaporated in the evaporators, means for circulating the thus cooled transfer liquid through the ejectors in series for withdrawing and condensing water vapor produced in the evaporators by mixing the water vapor directly with the lower temperature heat transfer liquid, said lower temperature liquid being circulated in a closed circuit between the evaporation and condensation sections and in counterflow to the sea water directional flow path.

References Cited

UNITED STATES PATENTS

| | | | |
|---|---|---|---|
| 2,976,224 | 3/1961 | Gilliland | 203—10 |
| 3,219,554 | 11/1965 | Woodward | 203—11 X |
| 3,232,847 | 2/1966 | Hoff | 203—11 |
| 3,236,747 | 2/1966 | Margiloff | 203—10 X |
| 3,298,932 | 1/1967 | Bauer | 203—11 |
| 3,303,098 | 2/1967 | Lagowski. | |
| 3,305,456 | 2/1967 | Broughton | 203—11 |
| 3,325,400 | 6/1967 | Hess et al. | 203—11 X |
| 3,337,421 | 8/1967 | El-Roy | 203—11 |
| 3,385,768 | 5/1968 | Yost | 203—26 |

NORMAN YUDKOFF, Primary Examiner

F. E. DRUMMOND, Assistant Examiner

U.S. Cl. X.R.

202—173, 177; 203—100